United States Patent [19]

Hedrick

[11] Patent Number: 5,946,642
[45] Date of Patent: Aug. 31, 1999

[54] AIR DATA MEASUREMENT SYSTEM WITH CIRCUIT FOR LINEARIZING PRESSURE TRANSDUCER OUTPUT

[75] Inventor: Geoffrey S.M. Hedrick, Malvern, Pa.

[73] Assignee: Innovative Solutions & Support Inc., Malvern, Pa.

[21] Appl. No.: 09/045,733

[22] Filed: Mar. 20, 1998

Related U.S. Application Data

[60] Provisional application No. 60/041,119, Mar. 20, 1997.

[51] Int. Cl.$^6$ .................................................. G06F 15/20
[52] U.S. Cl. ............................ 702/138; 702/98; 702/99; 73/708; 73/721; 73/727
[58] Field of Search ............................... 703/138, 98, 99; 73/727, 721, 708, 766, 862.623, 862.628

[56] References Cited

U.S. PATENT DOCUMENTS

| | | | |
|---|---|---|---|
| 4,135,403 | 1/1979 | Skarvada | 73/384 |
| 4,253,335 | 3/1981 | Shimomura | 73/384 |
| 4,360,888 | 11/1982 | Onsken et al. | 364/565 |
| 4,483,614 | 11/1984 | Rogers | 356/28.5 |
| 4,577,510 | 3/1986 | Bur et al. | 73/708 |
| 4,608,641 | 8/1986 | Snell | 364/434 |
| 5,610,845 | 3/1997 | Slabinski et al. | 364/565 |

OTHER PUBLICATIONS

"True Airspeed Meter", Eric Richman and Jim Roal, *True Airspeed System*, http://www.tricity.wsu.edu/~hroal/aspeed-.htm, Mar. 17, 1997, pp. 1–7.

Primary Examiner—John Barlow
Assistant Examiner—Hien Vo
Attorney, Agent, or Firm—Cohen, Pontani, Liebeman & Pavane

[57] ABSTRACT

An air data measurement system includes a device for sensing air pressure outside an aircraft, a pressure transducer in fluid communication with the air pressure sensing device and having a piezoresistive bridge attached on a flexible diaphragm. The piezoresistive bridge has an electrical resistance which varies in response to the sensed air pressure applied to the diaphragm and whose sensitivity varies with the magnitude of the excitation current passing therethrough. The system also includes a current supply operatively connected to the pressure transducer for supplying and varying the magnitude of the excitation current to the piezoresistive bridge. Further included is an output device connected to the pressure transducer for sensing a change in the electrical resistance of the piezoresistive bridge and outputting a signal from the piezoresistive bridge corresponding to the sensed air pressure. The current supply device varies the magnitude of the excitation current to the bridge in response to the output signal of the output device so as to change the sensitivity of the transducer relative to the airspeed of the aircraft.

6 Claims, 4 Drawing Sheets

AIR DATA MEASUREMENT SYSTEM WITH CIRCUIT FOR LINEARIZING PRESSURE TRANSDUCER OUTPUT

CROSS REFERENCE

This application claims the benefit of a prior-filed co-pending provisional application, Ser. No. 60/041,119, that was filed on Mar. 20, 1997.

BACKGROUND OF THE INVENTION

1. Field of the Invention

The present invention relates to air data measurement systems and more particularly, to an air data measurement system having a pressure transducer and a circuit for linearizing the analog output of the pressure transducer with respect to the airspeed of an aircraft.

2. Description of the Related Art

In order to determine the airspeed of an aircraft, one needs to measure the impact pressure, $Q_c$, of the airflow outside the aircraft. Impact pressure is defined as the difference between the total or Pitot pressure and the static pressure of the airflow. It varies exponentially with airspeed and is expressed as follows:

$$Q_c = P_s * (((1+(0.2*(A_s/S)^2))^{3.5}) - 1)$$

where $P_s$ = Pressure at Sea Level;
$A_s$ = Airspeed; and
$S_s$ = Speed of Sound.

The impact pressure is typically measured with a differential pressure transducer through a flexible diaphragm having a piezoresistive bridge attached thereon. The transducer is configured to generate a voltage signal corresponding to a deflection of the diaphragm. Due to the physical deflection characteristics of the flexible diaphragm, the pressure transducer cannot produce a voltage signal that is linearly proportional to pressures throughout its elastic deflection range. Thus, manufacturers specify a range in which the voltage signal is linearly proportional to a pressure range, that pressure range falling relatively within the elastic deflection range of the diaphragm. To measure accurately a complete range of pressures, users often employ a multitude of pressure transducers with different linear operating ranges. This solution, however, increases the cost and complexity of an air data measurement system.

There are prior art pressure transducers with extended linear ranges, i.e. capable of generating voltage signals that are linearly related to the deflection over an extended range of pressures, but they are expensive and thus have limited commercial applications. These pressure transducers are also undesirable as they have relatively large offset errors since the magnitude of the offset error is directly proportional to the pressure range of a transducer.

Furthermore, since the impact pressure Qc varies exponentially with airspeed, a differential pressure transducer would produce low voltage signals at low airspeed. These low voltage signals are susceptible to noise in the measurement system thereby rendering the low airspeed measurements inaccurate. Therefore, users often utilize costly and more sensitive pressure transducers for low airspeed range.

Accordingly, there is a need for an air data measurement system which utilizes a low-cost pressure transducer for an entire operating airspeed range of an aircraft and which provides highly accurate pressure measurements for low airspeed as well as for high airspeed.

SUMMARY OF THE INVENTION

An object of the present invention is to provide a low-cost air data measurement system which accurately measures air pressures over an entire airspeed range of an aircraft using a single pressure transducer.

Another object of the present invention is to provide a low-cost air data measurement system which accurately measures air pressures over an extended airspeed range of an aircraft using a single pressure transducer.

Still another object of the present invention is to provide a circuit which automatically increases the sensitivity of the pressure transducer at low airspeed and decreases the sensitivity of the pressure transducer at high airspeed.

Yet another object of the present invention is to employ a highly sensitive pressure transducer for the entire operating airspeed range so that transducer offset error can be minimized.

In accordance with a preferred embodiment, the air data measurement system includes a device for sensing air pressure outside an aircraft and a pressure transducer having a piezoresistive bridge attached on a flexible diaphragm. The piezoresistive bridge has an electrical resistance which varies in response to the sensed air pressure applied to the diaphragm and thus the bridge. The system also includes a current supply operatively connected to the pressure transducer for supplying and varying the magnitude of an excitation current to the piezoresistive bridge. Further included is an output device connected to the pressure transducer for sensing a change in the electrical resistance of the piezoresistive bridge and outputting a signal from the piezoresistive bridge corresponding to the sensed air pressure. The current supply means varies the excitation current to the bridge in response to the output signal of the output device so as to increase the sensitivity of the transducer at low airspeed and decrease the sensitivity of the transducer at high airspeed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
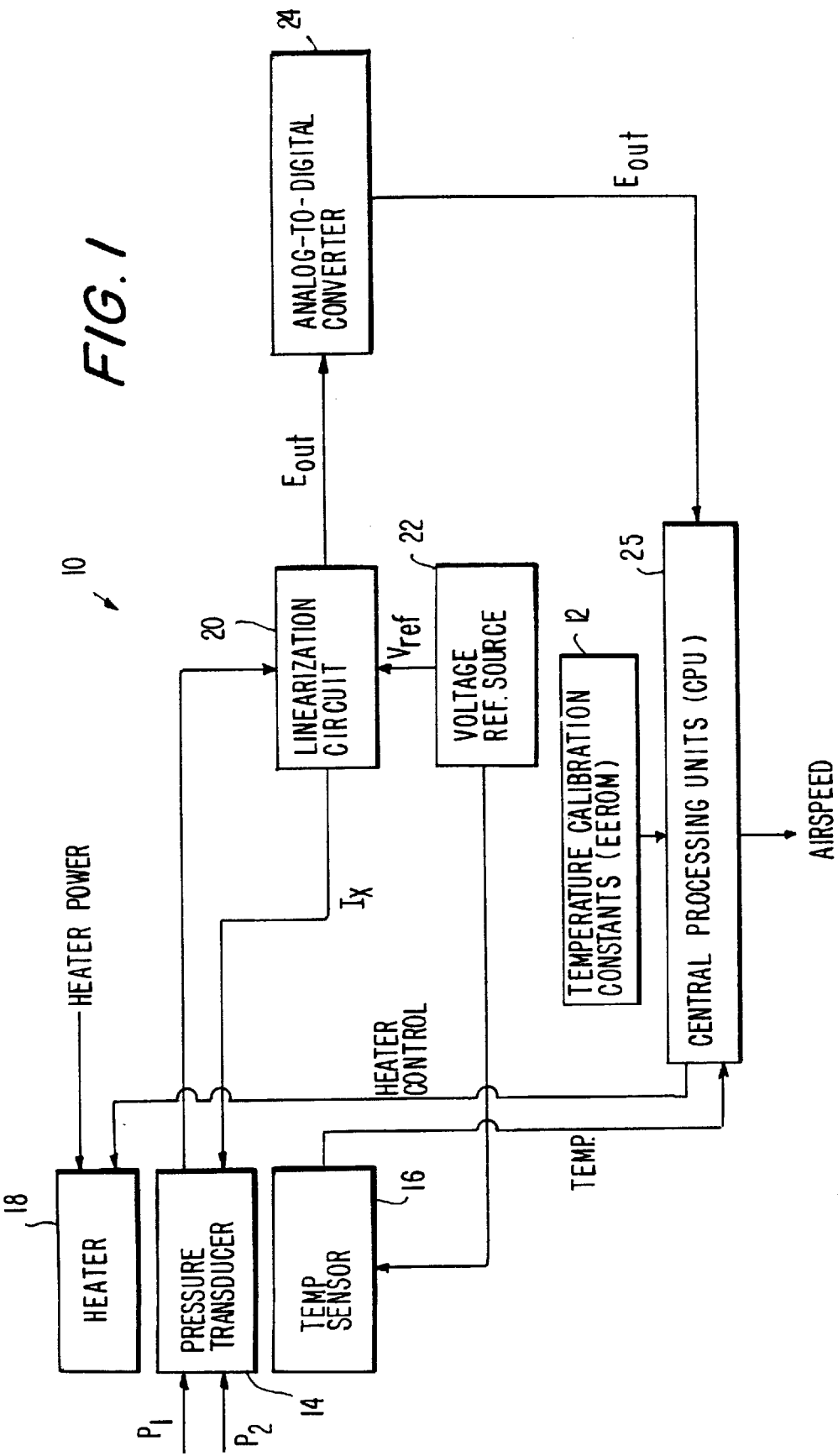
FIG. 1 illustrates schematically a preferred embodiment of the air data measurement system of the present invention.

Referring now to FIG. 1 in detail, there is shown a presently preferred embodiment of the air data measurement system 10 for measuring airspeed of an aircraft in accordance with the present invention. The system 10 includes a differential pressure transducer 14 which is connected to a pair of pressure ports (not shown) which are in communication with static and Pitot (or total) pressures $P_1$ and $P_2$ of the airflow outside the aircraft. Preferably, the pressure transducer 14 such as, for example, EG&G IC Sensors model number 1210A-002, includes a flexible diaphragm and a piezoresistive bridge whose electrical resistance varies with the measured pressure (i.e. the difference between $P_1$ and $P_2$) and whose sensitivity varies with the excitation current ($I_x$) passing therethrough. System 10 also includes a temperature sensor 16 for sensing the temperature of the pressure transducer 14, and a heater 18 connected to suitable heater control by, for example, a central processing unit (CPU) 25 and heater power for regulating or maintaining the temperature of the pressure transducer 14 within its specified temperature range. A voltage reference source 22 supplies voltage signals to the temperature sensor 16.

The air data measurement system 10 further includes a linearization circuit 20 which receives a reference voltage signal, $V_{ref}$, from the voltage reference source 22 and which generates an excitation current $I_x$ to the pressure transducer 14. The linearization circuit 20 outputs a pressure indicating signal, $E_{out}$, corresponding to the impact pressure sensed by the transducer 14. The system 10 may also include an analog-to-digital converter 24 for converting the analog pressure indicating signal $E_{out}$ into a digital signal $E'_{out}$ for processing by the CPU 25. The CPU 25 calculates the airspeed of the aircraft based on a number of parameters including $E'_{out}$, the temperature measurement signal (Temp) from the temperature sensor 16, and the appropriate calibration constants from EEROM 12 for correcting the temperature effects of the pressure transducer 14.

As will be described below, the excitation current $I_x$ provided by the linearization circuit 20 is automatically adjustable so as to vary the sensitivity of the transducer with respect to the airspeed of the aircraft. This feature advantageously allows a user to employ a low-cost pressure transducer with a small linear pressure range, e.g. about 2 psi or 4 inches Hg, for the entire operating airspeed range of the aircraft.

Figure 2:
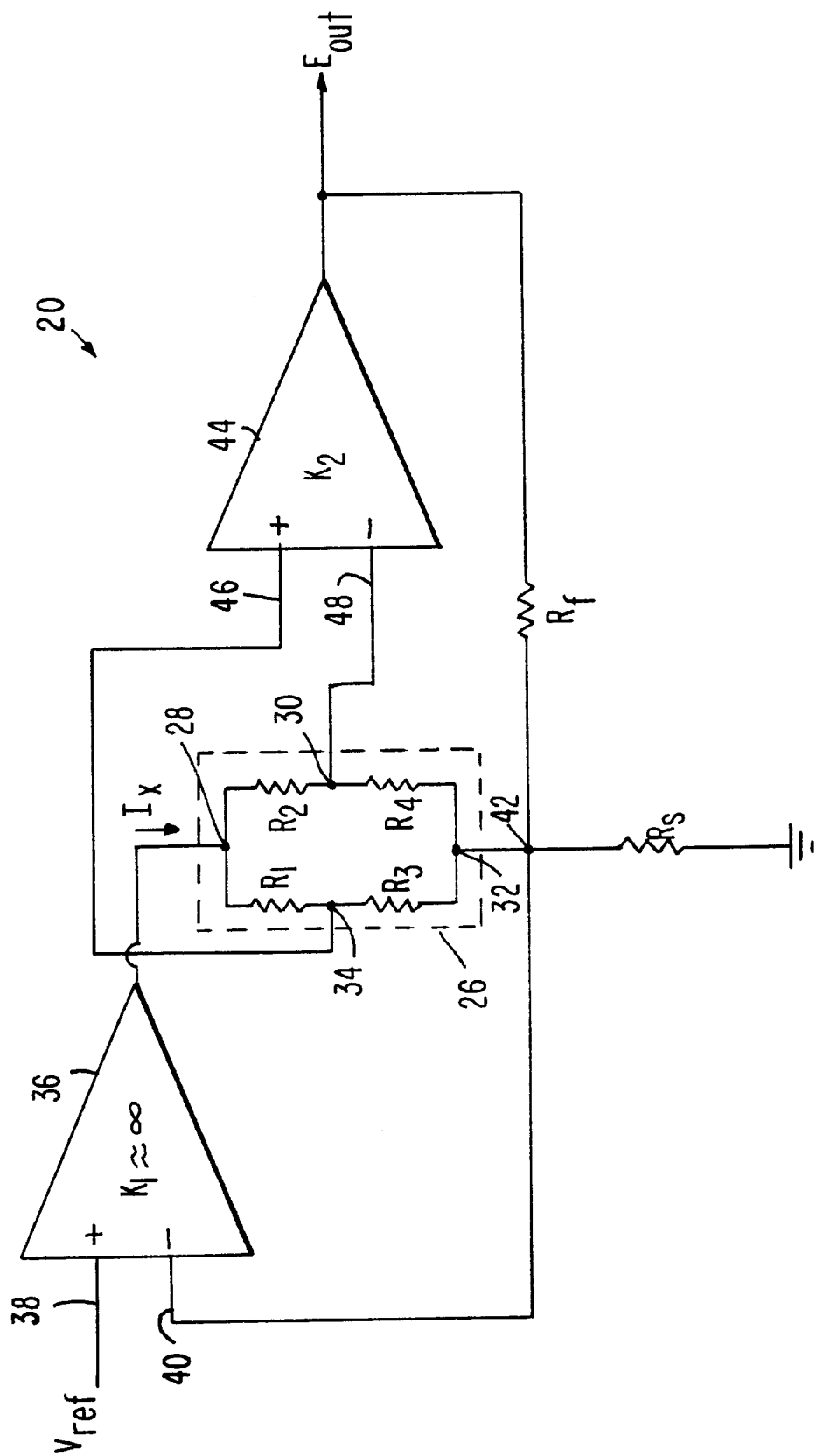
FIG. 2 is a schematic diagram of the preferred embodiment of the linearization circuit of the present invention.

FIG. 2 depicts schematically the piezoresistive bridge 26 of the pressure transducer 14 and a preferred embodiment of the linearization circuit 20. The piezoresistive bridge 26 includes resistors $R_1$, $R_2$, $R_3$, and $R_4$ and a junction 28, 30, 32 and 34. The linearization circuit 20 preferably includes an operational amplifier 36 having a non-inverting input 38, an inverting input 40 and a very large amplifier gain, $K_1$ (which is ideally infinite but can be set at, for example, 100,000). The non-inverting input 38 is connected to the reference voltage source 22 to receive reference voltage signal $V_{ref}$ (e.g. 2.5 volts) and the non-inverting input 40 is connected to node 32 of the bridge 26 through a junction 42. The output of amplifier 36 is connected to node 28 of bridge 26. A sensing resistor $R_s$ is connected to junction 42 at one end and to ground at another end. The circuit 20 also includes a differential amplifier 44 having a non-inverting input 46, an inverting input 48, and an amplifier gain, $K_2$ (e.g. $K_2$=100). The non-inverting input 46 is connected to node 34 of the bridge 26 and the inverting input 48 is connected to node 30 of the bridge 26 for outputting the pressure indicating signal $E_{out}$, which is proportional to the difference of the voltages at nodes 30 and 34 and which corresponds to the pressure imparted to the diaphragm and piezoresistive bridge 26. The circuit 20 further provides a feedback resistor $R_f$ having one end connected to junction 42 and the other end connected to the output of differential amplifier 44.

So connected, those skilled in the art will readily appreciate that the voltage signal $E_{out}$ and the resistance values of $R_f$ and $R_s$ affect the amount of excitation current $I_x$ passing through the bridge 26, thereby influencing the sensitivity of the bridge 26. Indeed, the excitation current, $I_x$, varies with the pressure indicating voltage signal, $E_{out}$, such that $I_x$ is at its maximum when $E_{out}$=0 and thereafter $I_x$ decreases as $E_{out}$ increases. This can be explained conceptually as follows: Amplifier 36 gets its current sense from junction 42 as it attempts to hold junction 42 at $V_{ref}$. Thus, when $E_{out}$ is less than $V_{ref}$, a portion of $I_x$ necessarily leaks through $R_f$. Then in order to maintain $V_{ref}$ across $R_s$, amplifier 36 must increase $I_x$ through the bridge 26 thereby increasing the sensitivity of bridge 26. On the other hand, when $E_{out}$ is greater than $V_{ref}$, current flows from differential amplifier 44 and through $R_f$ and $R_s$. This current flow reduces the demand for $I_x$ to maintain junction 42 at $V_{ref}$. Therefore, in response, operational amplifier 36 reduces the current $I_x$ through the bridge 26 thereby decreasing the sensitivity of the bridge 26.

In this embodiment, $V_{ref}$ may be viewed as a threshold value for adjusting $I_x$ such that when the magnitude of $E_{out}$ exceeds $V_{ref}$, $I_x$ decreases in magnitude. When the magnitude of $E_{out}$ falls below $V_{ref}$, $I_x$ increases in magnitude.

Thus, in accordance with the present invention, the linearization circuit 20 advantageously increases the excitation current $I_x$ through the bridge 26 at low airspeed (corresponding to low $E_{out}$) thereby increasing the sensitivity of the transducer 14 at low airspeed. Conversely, the sensitivity of the transducer 14 is reduced at high airspeed (corresponding to high $E_{out}$) as the linearization circuit 20 decreases the excitation current $I_x$ therethrough.

Providing such an adjustment to the transducer 14 is especially advantageous because the impact pressure, $Q_c$, as was noted by the equation above, varies exponentially with the airspeed of an aircraft. According to the equation, at low airspeed, a small change in pressure corresponds to a large change in the indicated airspeed while at high airspeed, a small change in pressure corresponds to a very small change in airspeed. Therefore, in accordance with the present invention, linearization circuit 20 provides greater measurement sensitivity and thus accuracy at low airspeed and decreased measurement sensitivity at high airspeed.

The present invention provides an air data measurement system which may utilize only one low-cost pressure transducer for the entire operating airspeed range of an aircraft. The pressure transducer preferably has a narrow specified linear range (e.g. 2 inches of Hg) which outputs relatively high voltage signals per unit of pressure due to its highly flexible diaphragm or the like. It is cautioned, however, that the selected transducer should be sufficiently strong so that it would not sustain any permanent deformation when operated under the intended range of pressures.

Advantageously, the accuracy and reliability of the pressure measurements by the air data system 10 are significantly improved over prior art systems with respect to at least: (1) low airspeed measurement because of the use of a high-sensitivity transducer whose output is enhanced by the linearizing circuit 20, and (2) offset error as it is a percentage of the specified pressure range of the pressure transducer (i.e. the smaller the specified pressure range the smaller the offset error).

In one particular embodiment, the components of the air data system 10 has the following specified values:

Linear Pressure Range of Pressure Transducer (14)=4.072 inches of Hg

Pressure Transducer Output Sensitivity=0.050 V FS (full scale)

Gain of Differential Amplifier (44)=100

Gain of Operational Amplifier (36)=100,000

Resistance of $R_s$=3,000 Ω
Resistance of $R_f$=3,750 Ω
$V_{ref}$=2.500 V

Figure 3:
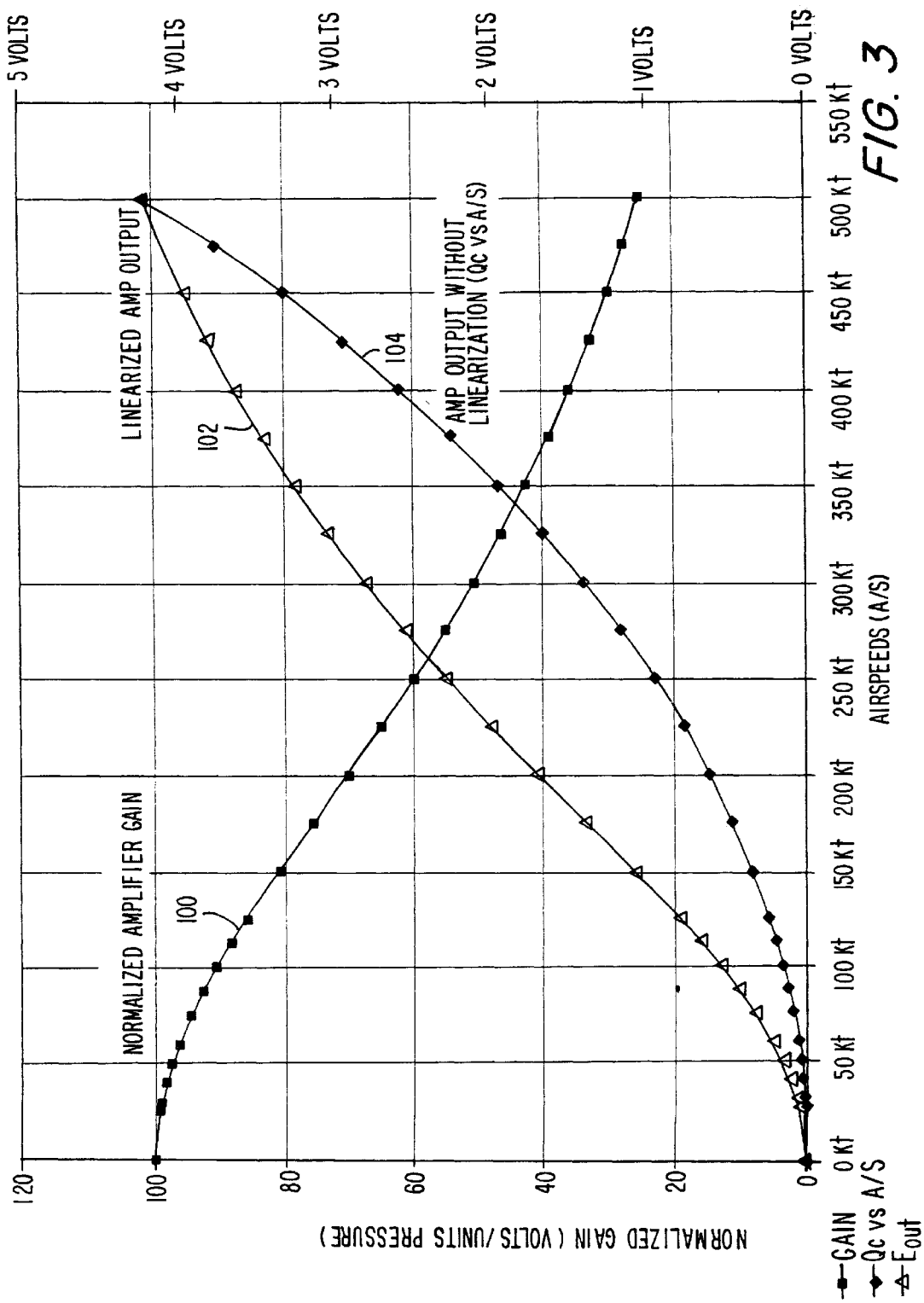
FIG. 3 graphically illustrates some parameters of an embodiment of the linearization circuit of FIG. 2.

The above resistance values of $R_f$ and $R_s$ are chosen so that the pressure-indicating signals, $E_{out}$, is substantially. linearized over the range of airspeed, e.g. from about 0 to about 500 knots. The performance of this embodiment can be demonstrated by the following parameters as a function of airspeed (A/S): (1) Normalized Gain (i.e., $E_{out}$/Impact Pressure) vs. A/S, which can be viewed as the system gain of the linearization circuit 20, (2) Linearized AMP output of the circuit 20 (i.e. $E_{out}$ vs. A/S), and (3) AMP output without the linearization circuit 20 (i.e. $Q_c$ vs. A/S), which is expressed as impact pressure as a function of airspeed. These parameters are shown graphically in FIG. 3. The values of the Normalized Gain (Curve 100) are displayed along the left vertical axis, and the values of Linearized AMP output (Curve 102) and of AMP output without linearization (curve 104) are displayed on the right vertical axis. As expected, the Normalized Gain (Curve 100) of this embodiment is highest at low airspeed and lowest at high airspeed. Furthermore, the linearized AMP output (Curve 102), i.e. $E_{out}$, is substantially linear with respect to airspeed. On the other hand, Curve 104, which shows AMP output without linearization varies exponentially with respect to airspeed and whose values are consistently lower than those of Curve 102 for the entire airspeed range (except for the end points).

It is apparent from the foregoing disclosure that a person of ordinary skill can easily select any appropriate resistance values for $R_f$ and $R_s$ so as to tailor the linearization circuit 20 for various applications, commercial or military, requiring different operating airspeed ranges.

Figure 4:
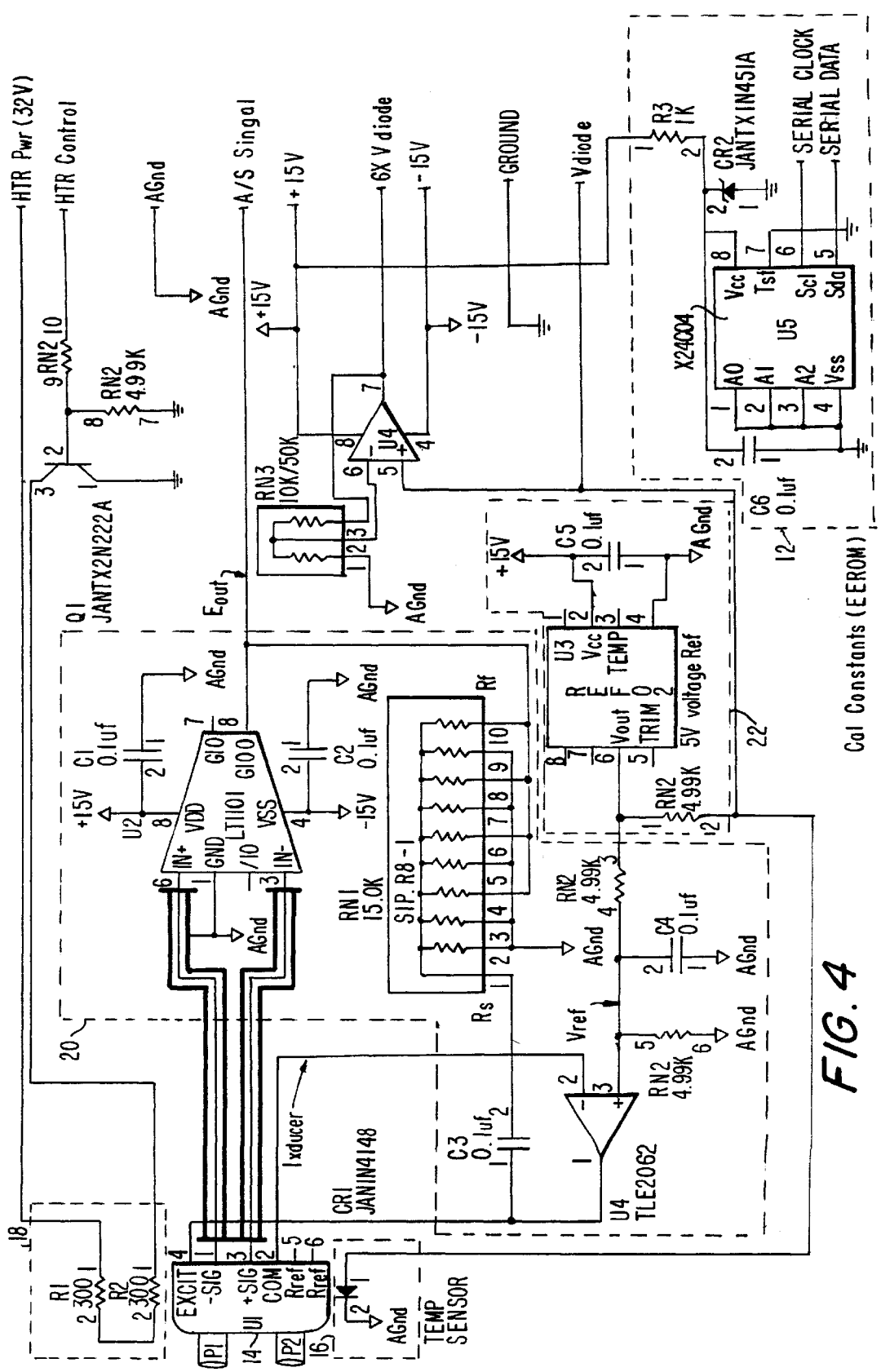
FIG. 4 is a circuit diagram of another embodiment of the air data measurement system of the present invention.

FIG. 4 is a circuit diagram of a preferred embodiment of the present invention. The embodiment includes pressure transducer 14, heater 18, temperature sensor 16, linearization circuit 20, voltage reference source 22, and an EEROM 12 having predetermined calibration constants for the pressure transducer 14. In this embodiment, resistors $R_s$ and $R_f$ are grouped from the same resistor network RN1 so that they have substantially the same physical properties and that the ratio of $R_f$ to $R_s$ will remain substantially the same over time and over a temperature range.

The air data measurement system of the present invention is suitable for a wide variety of uses and applications, besides airspeed measurement. By way of example, instead of measuring the airspeed of an aircraft, the air data measurement system 10 may employ only a static pressure transducer to measure the atmospheric pressure outside the aircraft so as to determine the pressure or barometric altitude of the aircraft.

It is also within the scope of the present invention that instead of the operational amplifier 36 and feedback resistor $R_f$, a feedback controller (not shown) and a controllable current supply (not shown) be employed. The feedback controller is connected to the output of the differential amplifier 36 and to the controllable current supply which supplies current $I_x$ to the bridge 26. The feedback controller, which may be digital or analog, analyzes $E_{out}$ by, for example, comparing $E_{out}$ to a set of predefined threshold values and determines the appropriate excitation current $I_x$ (corresponding to an identified threshold value) to be output by the controllable current supply.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. An air data measurement system for an aircraft, comprising:

means for sensing air pressure outside the aircraft;

a pressure transducer including a piezoresistive bridge in communication with the sensed air pressure from said sensing means, said piezoresistive bridge having an upstream end and a downstream end, and a first and a second resistive branch extending between the upstream and downstream ends, each of said first and said second resistive branches having an electrical resistance which varies in response to the sensed air pressure and further having a tap point;

excitation current supply means having an output end and an input end operatively connected to the upstream and downstream ends of said piezoresistive bridge respectively for supplying and varying the magnitude of the excitation current to said piezoresistive bridge;

output means having an input end connected to at least one of the tap points of said first and second resistive branches of said bridge for sensing a change in the electrical resistance of said piezoresistive bridge, said output means further including an output end for producing an output signal corresponding to the sensed air pressure; and feedback means connected to the input end of said excitation current supply means and the output end of said output means for causing said excitation current supply means to increase said excitation current to said piezoresistive bridge when the magnitude of said output signal is below a preselected value and for causing said excitation current supply means to decrease said excitation current to said piezoresistive bridge when the magnitude of said output signal is above the preselected value.

2. The air data measurement system of claim 1, wherein said sensed air pressure is the difference between Pitot pressure and static pressure.

3. The air data measurement system of claim 1, wherein said output means includes a differential amplifier having an output, an inverting input and a non-inverting input, and means for connecting said inverting and non-inverting inputs of said differential amplifier to said tap points of said piezoresistive bridge so that said differential amplifier outputs a voltage signal corresponding to the sensed air pressure.

4. The air data measurement system of claim 3, wherein said excitation current supply means includes:

means for supplying a reference voltage signal; and an operational amplifier having an output and an inverting and a non-inverting input, means for connecting said non-inverting input to said reference voltage supplying means, means for connecting said inverting input to said downstream end of said piezoresistive bridge, means for connecting the output of said operational amplifier to said upstream end of said piezoresistive bridge, said operational amplifier having a very large gain so that the inverting and non-inverting inputs are at substantially the same voltage; and said feedback means includes:
   a sensing resistor having a first end and a second end, means for connecting said first end of said sensing resistor to the downstream end of said piezoresistive bridge and to said inverting input of said operational amplifier;
   means for connecting said second end of said sensing resistor to a ground so that the excitation current flows from the upstream end to the downstream end of the piezoresistive bridge; and
   a feedback resistor having a first end connected to said output of said differential amplifier and a second end connected to said first end of said sensing resistor so that the excitation current from said operational amplifier varies in response to said output of said differential amplifier.

5. A circuit for linearizing the output of a pressure transducer, comprising:
   a reference voltage supply for supplying a preselected reference voltage;
   a pressure transducer including a piezoresistive bridge for sensing air pressure, said bridge having an upstream end and a downstream end, and a first and a second resistive branch extending between the upstream and downstream ends, each of said first and second resistive branches having an electrical resistance which varies in accordance with said sensed air pressure and further having a tap point;
   an operational amplifier for generating an excitation current to said piezoresistive bridge, said operational amplifier having an output and an inverting and a non-inverting input, means for connecting said non-inverting input to said reference voltage supply, means for connecting the output of said operational amplifier to said upstream end of said piezoresistive bridge, said operational amplifier having a very large gain so that the inverting and non-inverting inputs are at substantially the same voltage;
   a differential amplifier having an output and an inverting input and a non-inverting input, means for connecting said inverting and non-inverting inputs of said differential amplifier to said tap points of said piezoresistive bridge, said differential amplifier producing an output signal corresponding to a change in said electrical resistance of said piezoresistive bridge;
   a sensing resistor having a first end and a second end, means for connecting said first end of said sensing resistor to said downstream end of said piezoresistive bridge and said inverting input of said operational amplifier, means for connecting said second end of said sensing resistor to a ground; and
   a feedback resistor having a first end and a second end, means for connecting said first end of said feedback resistor to said output of said differential amplifier, and means for connecting said second end of said feedback resistor to said first end of said sensing resistor so that the excitation current from said operational amplifier to said upstream end of said bridge varies according to said output signal of said differential amplifier.

6. The air data measurement system of claim 1, wherein said excitation current supply means has a reference voltage, and the preselected value of said output signal is equal to the reference voltage.

* * * * *